United States Patent [19]

Aratame et al.

[11] Patent Number: 4,458,997

[45] Date of Patent: Jul. 10, 1984

[54] SINGLE LENS REFLEX CAMERA EQUIPPED WITH MIRROR ELEVATION DETECTOR AND SEQUENCE CONTROL

[75] Inventors: Kazuhisa Aratame; Saburo Yoneyama; Yasutsugu Nakagawa; Kunio Nakajima, all of Hachioji, Japan

[73] Assignee: Konishiroku Photo Industry Co., Ltd., Tokyo, Japan

[21] Appl. No.: 261,948

[22] Filed: May 8, 1981

[30] Foreign Application Priority Data

May 15, 1980 [JP] Japan ................................. 55-63429

[51] Int. Cl.³ ...................... G03B 17/18; G03B 19/12
[52] U.S. Cl. ..................................... 354/476; 354/155
[58] Field of Search ...................... 354/230, 36, 38, 43, 354/44, 56, 53, 60 E, 60 L, 60 R, 152, 234, 235, 266–268, 289, 22, 23 R, 155

[56] References Cited

U.S. PATENT DOCUMENTS

| | | | |
|---|---|---|---|
| 4,106,033 | 8/1978 | Nakamoto et al. | 354/23 D |
| 4,176,936 | 12/1979 | Kozuki et al. | 354/38 |
| 4,265,521 | 5/1981 | Uchidoi et al. | 354/23 D |
| 4,313,658 | 2/1982 | Sugiura et al. | 354/268 X |

*Primary Examiner*—William B. Perkey
*Attorney, Agent, or Firm*—Jordan B. Bierman; Linda Bierman

[57] ABSTRACT

A single lens reflex camera is provided with a photocell so positioned in the camera as to receive thereon light incident through the lens and reflected onto the photocell by the mirror. During each photographing operation, the mirror is pivotally elevated so that the incident light is no longer received by the photocell. The camera electronics monitors the photocell output which is representative of the magnitude of light received by the photocell and, unless a relatively rapid change in photocell output is detected during a photographing operation, an alarm is actuated to indicate failure of the mirror to properly pivot.

3 Claims, 4 Drawing Figures

FIG. 1
FIG. 2
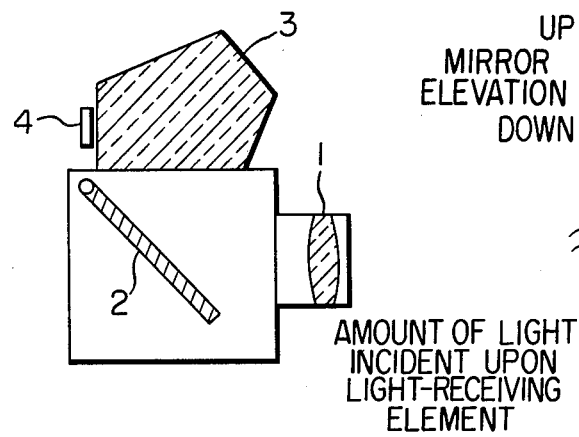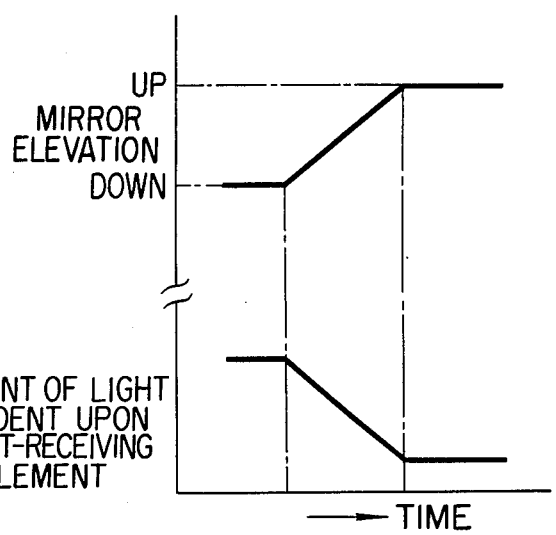
FIG. 3
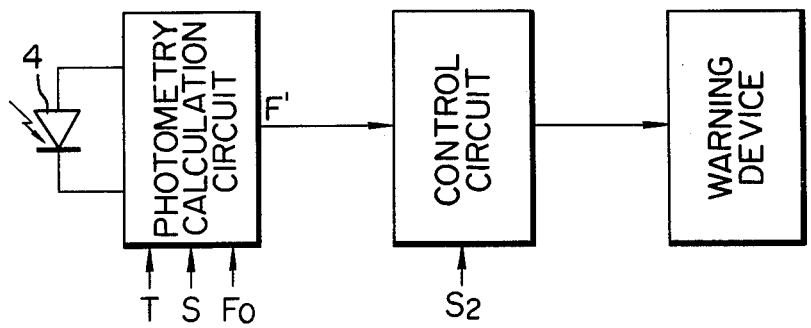
FIG. 4
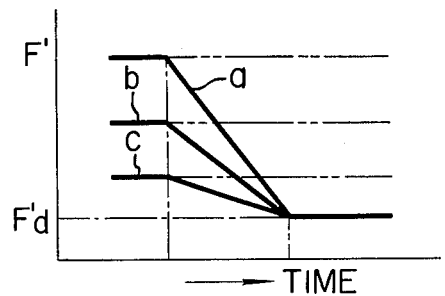

SINGLE LENS REFLEX CAMERA EQUIPPED WITH MIRROR ELEVATION DETECTOR AND SEQUENCE CONTROL

BACKGROUND OF THE INVENTION

1. Field of the Invention

The present invention relates to the improvement of a single lens reflex camera equipped with a photographing sequence control circuit.

2. Description of the Prior Art

In the conventional camera equipped with a photographing sequence control circuit wherein series of photographing sequence motions after the releasing including mirror elevation are controlled by a control circuit and are conducted based upon the action of the solenoid or the like, the control circuit advances photographing sequence motions including the shutter motion without mirror elevation and therefore the losing of photographing chance that the photographer first finds out, after the development of the film, the failure that the mirror was not elevated and the waste of film may happen, which is different from the single lens reflex camera wherein series of photographing sequence motions are conducted by the mechanical linkage.

SUMMARY OF THE INVENTION

The present invention is to offer the single lens reflex camera equipped with a photographing sequence control circuit wherein no erroneous photographing takes place, that is, the warning is made for the failure that the mirror is not elevated and/or shutter release operation is forbidden when the mirror is not elevated.

BRIEF DESCRIPTION OF DRAWINGS

FIG. 1 is the schematic vertical sectional side elevation,

FIG. 2 is a graph that shows a relation between the elevation of the mirror and the amount of incident light, FIG. 3 is a block circuit diagram of a warning means and FIG. 4 is a graph showing the output variation of photometry calculation circuit in FIG. 3.

DESCRIPTION OF THE PREFERRED EMBODIMENT

The present invention will be illustrated as follows with the aid of drawings.

FIG. 1 represents the schematic vertical sectional side elevation,

FIG. 2 is a graph that shows a relation between the elevation of the mirror and the amount of light incident upon light-receiving element, FIG. 3 is a block circuit diagram of a warning means and FIG. 4 is a graph showing the output variation of photometry calculation circuit in FIG. 3.

In FIG. 1, 1 is a lens, 2 is a mirror, 3 is a pentaprism and 4 is a light-receiving element of a photoelectric detecting means. In the illustration, a light-receiving element 4 is located at the position where the light that passes the pentaprism 3 in the finder optical system wherein the light passing the lens 1 is reflected on the mirror 2 and then strikes the pentaprism 3 is received. With such an arrangement, the variation of incident light amount to the light-receiving element 4 caused by the movement of the mirror 1 is large and thereby the detecting power for the movement of the mirror 2 is high which, however, does not limit the present invention and a photoelectric detecting means may be arranged at the side of incidence of the pentaprism 3. And this photoelectric detecting means can also be used for automatic exposure controlling.

The amount of incident light to the light-receiving element 4 varies according to the elevating movement of the mirror 2 as is shown in FIG. 2. Such variation in the amount of the incident light is detected by the circuit in FIG. 3 and when there is no variation in the amount of the incident light, that is, when the mirror does not elevate, the warning is made.

In FIG. 3, the light-receiving element 4 generates the electrical signals corresponding to the amount of the incident light and puts them into the photometry calculation circuit and the photometry calculation circuit then generates the stop information F' calculated based upon the shutter speed information T, the film speed information S, the maximum aperture F value information Fo and the signal from the light-receiving element 4 and puts it into the control circuit. This stop information F' varies as is shown in FIG. 4 corresponding to the variation in the amount of the incident light to the light-receiving element 4 shown in FIG. 2. The diagrams a, b and c represent the different results caused by the difference in conditions such as the shutter speed information T, the film speed information S and the maximum aperture F value information Fo and in either case when the releasing operation is made and the mirror is elevated, the stop information F' goes to the level of F'd and if the mirror is not elevated, the stop information F' does not change as shown in the two-dot chain line. So, the control circuit in FIG. 3 judges if the stop information F' goes to the level of F'd or not at the point when a certain period of time enough for the mirror to complete its elevation has passed since the control circuit receives the releasing information following the releasing operation, and if it does not go to the level of F'd, the warning device is operated. In the warning device, the publicly-known indication means such as the lighting indication by LED (Light Emitting Diode), the sound indication by PCV (Piezoelectric Ceramics Vibrator) and other changing indication of indication board etc. are used. Thereby, the photographer is notified of the occurrence of abnormality in the mirror operation in advance, which prevents the useless repetition of photographing operation. Such a useless repetition can be prevented by forbidding shutter release operation when the warning device is operated.

What is claimed is:

1. In a single lens reflex camera having a lens, a viewfinder, and a mirror pivotable during a photographing operation from a viewing position, in which the mirror is disposed in the path of light incident through the lens to reflect said incident light to the viewfinder, to an elevated position remote from the reflection path for enabling the incident light to impinge upon recording film in the camera, the improvement comprising:

photoelectric means for receiving thereon light incident through the lens and reflected by the mirror in said viewing position of the mirror, and for outputting a signal representative of the magnitude of light received thereon, said photoelectric means being so disposed that in said viewing position of the mirror the light incident through the lens is reflected onto said photoelectric means but in said elevated position of the mirror substantially none of said incident light is received by said photoelectric means as a consequence of the elevation of the mirror out of the reflection path of said incident light, means for monitoring the output of said photoelectric means for detecting a change in the photoelectric means output as the mirror is pivoted for a photographing operation from its viewing position in which said incident light is reflected onto and received by said photoelectric means to said elevated mirror position in which substantially none of said incident light is reflected onto said photoelectric means, and warning means for providing an alarm signal when said detecting means fails to detect a change in the output of said photoelectric means within a certain period of time enough for the mirror to complete its elevation.

2. In a camera in accordance with claim 1, said photoelectric means being disposed in the camera viewfinder.

3. In a camera in accordance with claim 1, said photoelectric means being additionally connected for automatic exposure determination and control in a photographing operation.

* * * * *